United States Patent [19]

Sahara et al.

[11] 4,329,035
[45] May 11, 1982

[54] EXPOSURE CONTROL SYSTEM FOR LENS INTERCHANGEABLE CAMERAS

[75] Inventors: Masayoshi Sahara, Sennan; Toshio Kobori; Seiji Yamada, both of Sakai, all of Japan

[73] Assignee: Minolta Camera Kabushiki Kaisha, Osaka, Japan

[21] Appl. No.: 221,404

[22] Filed: Dec. 31, 1980

Related U.S. Application Data

[63] Continuation of Ser. No. 5,704, Jan. 23, 1979, abandoned.

[30] Foreign Application Priority Data

Jan. 25, 1978 [JP] Japan .................................. 53-7515

[51] Int. Cl.³ .............................................. G03B 7/087
[52] U.S. Cl. ......................................... 354/37; 354/38
[58] Field of Search ................................. 354/28-30, 354/36-38, 43, 44, 41, 46, 50, 51, 286, 289, 291

[56] References Cited

U.S. PATENT DOCUMENTS 4,118,726  10/1978  Kuramoto et al. ............. 354/289 X
4,168,892   9/1979  Ueda et al. ...................... 354/38
4,174,160  11/1979  Nanba et al. .................. 354/38 X Primary Examiner—L. T. Hix
Assistant Examiner—William B. Perkey
Attorney, Agent, or Firm—Watson, Cole, Grindle & Watson

[57] ABSTRACT

In an exposure control system for a camera having an interchangeable objective lens, a diaphragm mechanism defining the diaphragm aperture, a preset means for presetting the f-number of the diaphragm aperture and a shutter mechanism for effecting an exposure, a light measuring circuit generates an output signal having a level representative of the light from an object to be photographed and a reference signal circuit generates a reference signal having a predetermined level. A programmed signal circuit generates a programmed signal in accordance with the output signal and the reference signal, and an exposure control circuit controls both the diaphragm and the shutter mechanisms such that the diaphragm aperture and the shutter speed have a combination of values commensurate with the programmed signal. The programmed signal circuit includes a variable member having an electric parameter variable in accordance with the number of steps of the diaphragm aperture from the minimum f-number to a preset f-number.

14 Claims, 2 Drawing Figures

EXPOSURE CONTROL SYSTEM FOR LENS INTERCHANGEABLE CAMERAS

This is a continuation, of application Ser. No. 5,704 filed Jan. 23, 1979, now abandoned.

BACKGROUND OF THE INVENTION

1. Field of the Invention

The present invention relates to an exposure control device for controlling exposure in accordance with an output signal from a through-the-lens light measuring system which measures object light transmitted through a camera objective, and more particularly it relates to such an exposure control device and which is capable of programmed exposure control and applicable to lens interchangeable cameras.

2. Prior Art

There have been proposed programmed exposure control cameras which permit manual selection of various programs for exposure control, for example, in U.S. Pat. Nos. 3,950,765 and 3,964,073. However, such cameras, leaving the selection of the program to a photographer, are not always convenient and are particularly difficult to handle for programmed exposure control photography if many interchangeable lenses are used.

SUMMARY OF THE INVENTION

The primary object of the present invention is to provide a programmed exposure control device wherein automatic selection is made for a program commensurate with the minimum f-number of a lens coupled to a camera body.

A programmed exposure control device according to the present invention controls exposure based on a program commensurate with a lens to be used, with no setting operation required by the photographer for program selection, the device thus being very convenient in that the photographer can devote himself or herself to photographing.

DETAILED DESCRIPTION OF A PREFERRED EMBODIMENT

Figure 1:
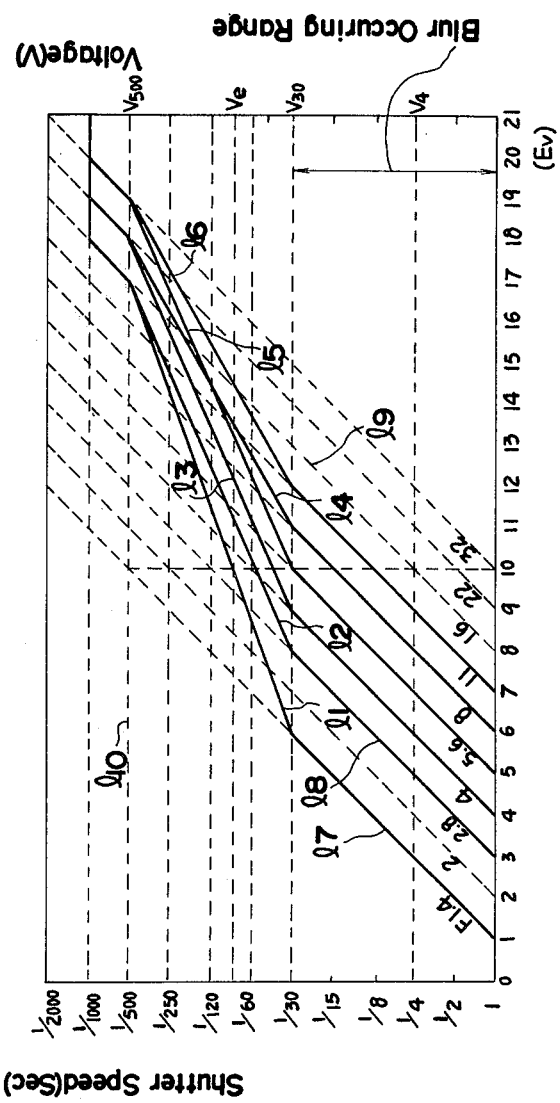
FIG. 1 is a graph showing programs of exposure control.

Referring now to FIG. 1, programs for the exposure control according to the present invention will be explained. FIG. 1 is a graph illustrating a combination of the diaphragm aperture and the shutter time which vary with the exposure value (EV), the exposure value being represented by the abscissa of the graph, the shutter time by the ordinate thereof, and the diaphragm aperture by the gradient line thereof. The diaphragm aperture on each gradient line is identical. It is to be noted that the ordinate representing the shutter time is also graduated in voltages for use as shutter time signals.

The solid lines 11 through 16 in the graph represent possible programs with the programmed exposure control device. Solid lines 11 and 12 represent the programs for lenses having minimum f-numbers of F1.4 and F2.8 with maximum f-numbers each of F16. As is clear from the graph, the optimum shutter time to be combined with the maximum f-number is equalized for lenses whose maximum f-number is identical, while the gradient of a program is made greater for lenses whose minimum f-number is larger, so that exposure is controlled by the minimum f-number of each lens only in the blur-occurring range (e.g. at a shutter time longer than 1/30 second). Program setting in this manner permits the effective use of diaphragm apertures from the minimum f-number to the maximum f-number for the shutter time in the photographically available range without causing a blurred picture with the camera held by hand.

Figure 2:
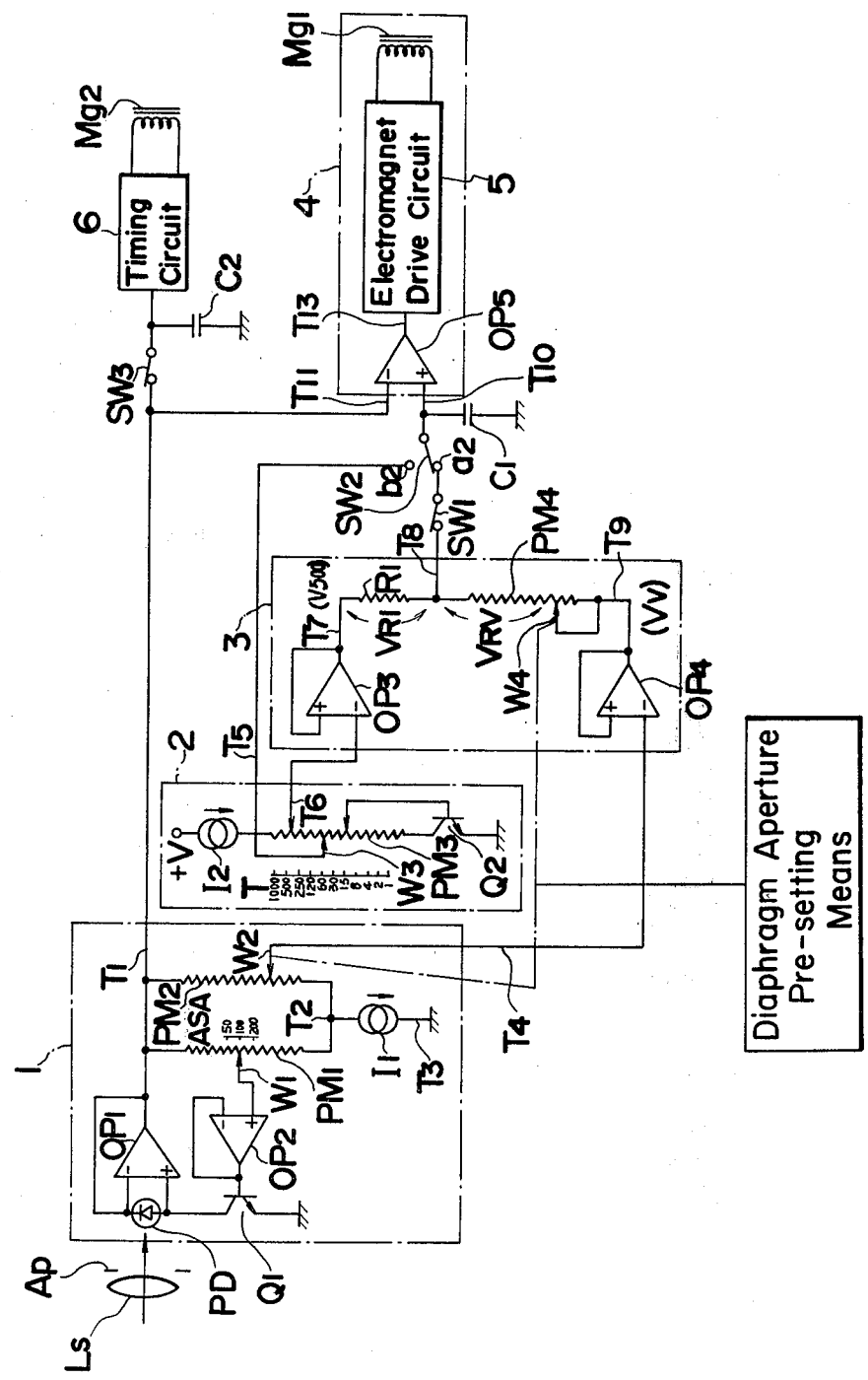
FIG. 2 is a circuit diagram schematically illustrating an embodiment of the present invention.

The following is an explanation of a programmed exposure control system for achieving such programs. FIG. 2 is an electric circuit diagram according to an embodiment of the present invention which may be associated with a single lens reflex camera. With reference to FIG. 2, light measuring circuit 1 includes light receiving element PD receiving object light which has been transmitted through camera objective Ls and diaphragm aperture AP. Light measuring circuit 1 produces a voltage signal as a function of the brightness of an object detected by light receiving element PD. Light measuring circuit 1 comprises a photodiode PD as the light receiving element, two operational amplifiers OP1 and OP2, logarithmic compression transistor Q1, potentiometer PM1 for obtaining film sensitivity information, potentiometer PM2 for obtaining preset diaphragm aperture information and constant current source I1. Photodiode PD in light measuring circuit 1 produces photoelectric current proportional to the intensity of object light incident on its light receiving surface. The photoelectric current flows to transistor Q1 as collector current and a voltage proportional to the logarithmic value of the collector current is produced across the base and emitter of transistor Q1. The voltage thus produced is transmitted through operational amplifier OP2, which serves as a buffer circuit, to slider W1 of potentiometer PM1. Thus a voltage signal representative of an optimum exposure time for the brightness of an object, the diaphragm aperture through which the object light has passed, and the film sensitivity to be used is generated at terminal T1 of potentiometers PM1 and PM2. Slider W2 of potentiometer PM2 is slid from terminal T1 toward terminal T2 in response to operation of a diaphragm aperture presetting means provided on an interchangeable lens barrel and in accordance with the number of steps of diaphragm aperture values from the minimum f-number to the preset diaphragm aperture. The above construction is similar to, for example, sliding element 4 of potentiometer VR2 in FIG. 4 of U.S. Pat. No. 4,037,235. Therefore, generated at slider W2, or a terminal T4, with the diaphragm aperture fully open, is a voltage signal representative of an optimum shutter time commensurate with a preset diaphragm aperture.

Reference voltage generating circuit 2 generates a voltage signal corresponding to a manually selected shutter time, as well as a constant voltage signal. Reference voltage generating circuit 2 includes constant current source I2, potentiometer PM3 and transistor Q2 for compensating for the temperature characteristics of transistor Q1. Generated at output terminal T5 of reference voltage generating circuit 2 is a voltage signal commensaturate with the shutter time to be selected by a photographer when the circuitry shown in FIG. 2 is used in the shutter-time-priority automatic diaphragm aperture control mode. A constant voltage signal commensurate with a shutter time of e.g. 1/500 second is generated at output terminal T6, the signal being used in a manner to be subsequently described to produce a signal for programmed exposure control. Program signal generating circuit 3 generates signals for the programs represented by solid lines 11 through 16 illustrated in FIG. 1. Two voltage signals from terminals T4 and T6 are applied to program signal generating circuit 3. The two voltage signals are applied through buffer amplifiers OP3 and OP4 to both ends of a series connection of a resistor R1 and variable resistor PM4, which connection is connected to terminals T7 and T9 of buffer amplifiers OP3 and OP4. Slider W4 of potentiometer PM4 is slid in accordance with the number of steps of diaphragm aperture values from the minimum f-number to the diaphragm aperture value preset by a diaphragm aperture presetting means in a similar manner to slider W2 of potentiometer PM2. Generated from terminal T8 is a voltage having a level or value between that of the voltages developed at terminals T7 and T9. Assuming that the voltage generated at terminal T8 is VP, the resistance of resistor R1 between terminal T7 and terminal T8 is R1 and the resistance between terminal T8 and slider W4 in potentiometer PM4 is RV, then the following equation is obtained:

$$(R1/RV) = (V500 - VP)/(VP - Vt) \tag{1}$$

wherein V500 and Vt represent voltages generated at terminals T7 and T9, respectively. Substituting a constant voltage of V30 corresponding to a shutter time of 1/30 second for VP in equation (1), the following is obtained as equation (2):

$$(R1/RV) = (V500 - V30)/(V30 - Vt) \tag{2}$$

wherein (V500−V30) represents a constant voltage. With reference to FIG. 1, it is obvious that (V30−Vt) is proportional to the number of steps of diaphragm aperture values from the minimum f-number to the maximum f-number for any interchangeable lens. Therefore, if the resistance RV of potentiometer PM4 is varied in proportion to the maximum number of steps of diaphragm aperture values to be stopped-down for an interchangeable lens when the resistance of resistor R1 is fixed constant, program signals represented by solid lines 11 through 16 in FIG. 1 can be obtained. Accordingly, potentiometer PM4 may be of the type having a linear characteristic, and slider W4 of potentiometer PM4 may be constructed such that it is slid at intervals commensurate with the number of steps of diaphragm aperture values to be stopped-down in response to an operation of the diaphragm aperture presetting means.

First storage switch SW1, one end of which is connected to terminal T8, is opened in association with the shutter release operation immediately before diaphragm aperture AP is stopped-down, to store in a first storage capacitor C1 an output voltage generated from terminal T8 when diaphragm aperture AP is at the minimum f-number. Exposure mode selection switch SW2 whose movable contact is always connected to capacitor C1 permits the programmed exposure control mode with contact a2 being selected, and the shutter-time-priority exposure control mode with contact b2 being selected.

Diaphragm aperture control circuit 4 combined with a diaphragm aperture control mechanism (not shown) causes, in association with the shutter release operation, diaphragm aperture AP to start stopping-down after first storage switch SW1 has been opened, and an electromagnet Mg1 to be activated when diaphragm aperture AP has been stopped-down to a desired value to arrest a diaphragm operating member while in stopping-down operation to thereby determine the diaphragm aperture. Voltage comparison circuit OP5 in diaphragm aperture control circuit 4 inverts the output level when the potentials at terminals T10 and T11 become in a predetermined relationship, for example, the potentials become equal to one another. Electromagnet drive circuit 5 then activates electromagnet Mg1 in response to the inverted output level from voltage comparison circuit OP5. The desired value of the aperture provides the predetermined relationship. It is apparent that various other well-known diaphragm aperture control circuits may be used.

Second storage switch SW3 is opened in association with the shutter release operation after diaphragm aperture AP has been determined, so that second storage capacitor C2 stores a voltage signal appearing at terminal T1 as a function of object light measured through the determined diaphragm aperture AP. Timing circuit 6 generates an output after a lapse of given time commensurate with a voltage signal from second storage capacitor C2, from the commencement of exposure. Electromagnet Mg2 is activated in response to an output from timing circuit 6 to start the travelling of a shutter closing member. Description of mechanisms for the aforesaid diaphragm aperture control and shutter time control are omitted since they are unnecessary for an understanding of the present invention. For example, however, it is obvious that the mechanisms as described in U.S. Pat. No. 3,972,055 and the aforesaid U.S. Patents, or a variety of other wellknown mechanisms, can be used.

The circuit operation with reference to FIG. 2 will now be explained. Assume that an interchangeable lens having a minimum f-number of F1.4 and maximum f-number of F16 is mounted on a camera and switch SW2 is closed on contact a2 for the photographic mode under programmed exposure control. Further assume that the diaphragm presetting means is set to the maximum f-number F16 and the circuit is supplied with power so that the camera is ready for photographing. With the above conditions, voltage signals representative of lines 17 and 19 in FIG. 1 commensurate with the brightness of an object are generated from terminals T1 and T4 in light measuring circuit 1, while a voltage of V500 (represented by line (l10) in FIG. 1) corresponding to a shutter time of 1/500 second is generated from output terminal T6 of reference voltage generating circuit 2. Therefore, generated at output terminal T8 of program signal generating circuit 3 is a voltage represented by line 11 in FIG. 1. Assuming that the brightness of an object is, for example, EV10 in exposure value, the voltages of V500 and V4 corresponding to the shutter times of 1/500 second and ¼ second, respectively, are generated from output terminals T1 and T4 of light measuring circuit 1, and at the same time, a voltage of Ve corresponding to a shutter time between 1/120 second and 1/60 second is generated from terminal T8.

With the camera operation initiated upon depression of the shutter button, a release mechanism (not shown) operates to open switch S1 first, thereby causing signal voltage Ve to be stored by first storage capacitor C1. Then, the stopping-down of diaphragm aperture AP is commenced, and as the stopping-down progresses, the voltage level at output terminal T1 decreases. When the voltage at output terminal T1 thus decreases to coincide with the voltage of first storage capacitor C1, the output level of voltage comparison circuit OP5 is inverted to activate electromagnet Mg1, and as a result, the diaphragm aperture stopping-down operation is arrested to determine the diaphragm aperture. Since a slight delay actually occurs in time from the inversion of the output level at voltage comparison circuit OP5 until a diaphragm aperture is determined, voltage comparison circuit OP5 may be constructed such that it operates earlier by a time commensurate with such a delay. After the diaphragm aperture has been determined, storage switch SW3 is opened, and well-known exposure time control is effected thereafter in response to a voltage signal from second storage capacitor C2 simultaneously with the shutter opening. When the brightness of an object is EV17, the optimum shutter time and diaphragm aperture for a lens whose maximum f-number is F16 become 1/500 and F16, respectively. However, if the actually determined diaphragm aperture is F11, the shutter time is automatically corrected to 1/1000 second. It is apparent, however, that no correction beyond the control limit mechanically set is possible.

The foregoing is an explanation of operation for a lens whose minimum f-number is F1.4 and maximum f-number is F16. The same explanation can apply to any other lens. Further, in the above embodiment of the present invention, a signal voltage corresponding to a shutter time of 1/500 second is generated from output terminal T6 of standard voltage generating circuit 2, or the shutter time for a hand blur-occurring limit is set to 1/30 second. Naturally, however, these values may be different depending on the circumstances. Therefore, since making the resistance of resistor R1 variable permits the alteration of the shutter time set for a blur-occurring limit, the resistance of resistor R1 may be changed according to the maximum f-number of a lens and the shutter time altered to be set as a blur-occurring limit for each of the maximum f-numbers of different lenses.

What is claimed is:

1. An exposure control system for a camera having an interchangeable objective lens, a diaphragm mechanism defining a diaphragm aperture, preset means for presetting the f-number fo the diaphragm aperture, and a shutter mechanism for effecting an exposure, said control system comprising:
   a light measuring circuit for generating an output signal having a level representative of the light from an object to be photographed;
   a reference signal circuit for generating a reference signal having a predetermined level;
   a program signal circuit for generating a program signal in accordance with said output signal and said reference signal, and including a series connection of a fixed resistance and a variable resistance, the latter being coupled with said preset means to be varied in accordance with the number of steps of the diaphragm aperture from the minimum f-number to a preset f-number, said program signal being obtained from the junction of said resistances with said output and reference signals being respectively applied to the end terminals of said series connection; and
   an exposure control circuit for controlling the diaphragm aperture in accordance with said program signal and controlling the shutter mechanism in accordance with said output signal as determined with said diaphragm controlled.

2. An exposure control system as in claim 1 wherein said light measuring circuit includes a photocell receiving the light from an object through said objective lens and said diaphragm aperture, and means for shifting the output of said photocell in accordance with a preset f-number and a set film sensitivity so that said output from said light measuring circuit corresponds to a shutter speed suitable for the object light measured, preset f-number and set film sensitivity, and said reference signal circuit includes means for generating a reference signal corresponding to a shutter speed of a high value.

3. An exposure control system as in claim 2 where the values of said fixed and variable resistances are determined to satisfy a formula $$R1/RV = (Vr - Vm)/(Vm - Vt)$$

wherein R1 is the value of the fixed resistance, RV is the value of the variable resistance, Vr is the level of the reference signal, Vm is a level corresponding to a minimum shutter speed that does not cause a blurred picture with the camera held by hand, and Vt is the level of the output signal.

4. An exposure control system for a camera having an interchangeable objective lens, a diaphragm mechanism defining a diaphragm aperture, preset means for presetting a diaphragm aperture value, and a shutter mechanism for effecting an exposure, said control system comprising:
   a light measuring circuit for generating an output signal having a level representative of the light from an object to be photographed;
   a reference signal circuit for generating a reference signal having a predetermined level;
   a program signal circuit for generating a program signal having a level between said output and reference signals, said level being determined by a given ratio of said output and reference signals;
   means for changing said ratio in accordance with the diaphragm value set by said preset means; and
   an exposure control circuit for controlling the diaphragm aperture and subsequently controlling the shutter mechanism in accordance with the controlled diaphragm aperture.

5. An exposure control system as in claim 4 wherein said program signal circuit includes a series connection of a fixed resistance and a variable resistance, said program signal being obtained from the junction of said resistances, and said output and reference signals being respectively applied to the terminals of said series connection.

6. An exposure control system as in claim 5 wherein said light measuring circuit includes a photocell receiving light from an object through said objective lens and said diaphragm aperture, and means for shifting the output of said photocell in accordance with a preset f-number and a set film sensitivity so that said output from said light measuring circuit corresponds to a shutter speed suitable for the object light measured, preset f-number and the set film sensitivity, and said reference signal circuit includes means for generating a reference signal corresponding to a high shutter speed.

7. An exposure control system for a camera having an objective lens, a diaphragm mechanism defining a diaphragm aperture, a preset means for presetting a diaphragm aperture, and a shutter mechanism for effecting an exposure, said control system comprising:
   a light measuring circuit including a photoelectric member which receives and detects the light from an object to be photographed through said objective lens and said diaphragm aperture, and means for generating a first signal corresponding to a first exposure time as a function of a set film sensitivity and the light detected by said photoelectric member;

a first circuit means coupled with said light measuring circuit and said preset means for generating a second signal corresponding to a second exposure time which is longer than said first exposure time by an amount corresponding to a step difference between the full aperture value and said preset aperture value;

a reference signal circuit for generating a third signal corresponding to a third exposure time which is fixed at a comparatively high value in the available exposure time range;

a second circuit means coupled with said first circuit means and said reference signal circuit for generating a fourth signal corresponding to a fourth exposure time which is between and has a given relationship with said second and third exposure times;

a diaphragm control circuit for controlling said diaphragm aperture in accordance with the difference between said first and fourth signals with said second exposure time not shorter than said third exposure time; and a shutter control circuit for controlling said shutter mechanism in accordance with a signal having a predetermined relationship with said fourth signal.

8. An exposure control system as in claim 7, wherein said shutter control signal is equal to said fourth signal.

9. An exposure control system as in claim 8 wherein said diaphragm control circuit includes a comparison circuit having a pair of input terminals coupled with said light measuring circuit and said second circuit means.

10. An exposure control system as in claim 8 further comprising means for holding the fourth signal that is generated with said diaphragm aperture fully open, and wherein said diaphragm control circuit includes a comparison circuit having a pair of input terminals respectively coupled with said light measuring circuit and said means for holding, said comparison circuit comparing said fourth signal stored in said means for holding with said first signal at the time when said diaphragm mechanism is being stopped-down, said comparison circuit generating a control signal when the signals applied to its terminals reach a given relationship with each other, said diaphragm control circuit further including an electromagnetic means for arresting said diaphragm mechanism in response to said control signal.

11. An exposure control system as in claim 10 wherein said shutter control circuit includes means for controlling said shutter mechanism in accordance with said first signal at the time when said photoelectric member detects the light through the diaphragm aperture controlled by said diaphragm control circuit.

12. An exposure control system as in claim 7 wherein said shutter control circuit includes storage means for storing the first output generated at the time when said diaphragm aperture has been determined by said diaphragm control circuit, and a timing circuit for controlling said shutter mechanism in accordance with the signal stored in said storage means.

13. An exposure control system as in claim 7 wherein said second circuit means includes a voltage divider connected between the output terminals of said first circuit means and said reference signal circuit, said fourth signal being tapped from the junction point of said voltage divider.

14. An exposure control system as in claim 13 wherein said voltage divider includes a serially connected fixed resistor and a variable resistor, the latter being coupled with said preset means to be varied thereby.

* * * * *